E. B. ROSE.
TIRE-UPSETTER.

No. 178,082. Patented May 30, 1876.

UNITED STATES PATENT OFFICE.

EBENEZER B. ROSE, OF GOSHEN, ASSIGNOR TO HIMSELF AND GEORGE M. BULL, OF NEW BALTIMORE, NEW YORK.

IMPROVEMENT IN TIRE-UPSETTERS.

Specification forming part of Letters Patent No. 178,082, dated May 30, 1876; application filed May 1, 1876.

*To all whom it may concern:*

Figure 1:
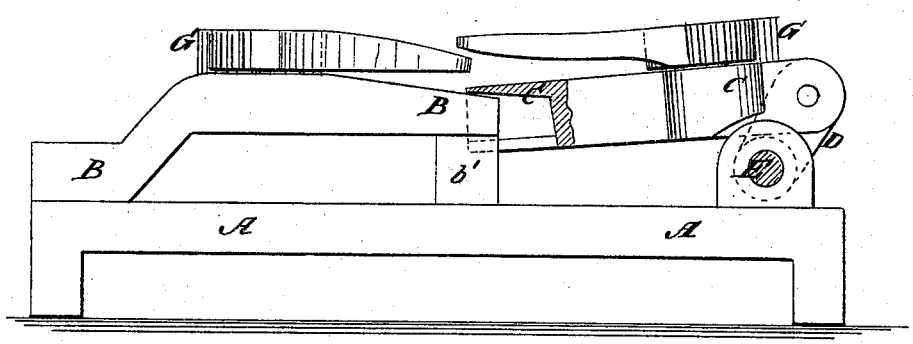
Figure 2:
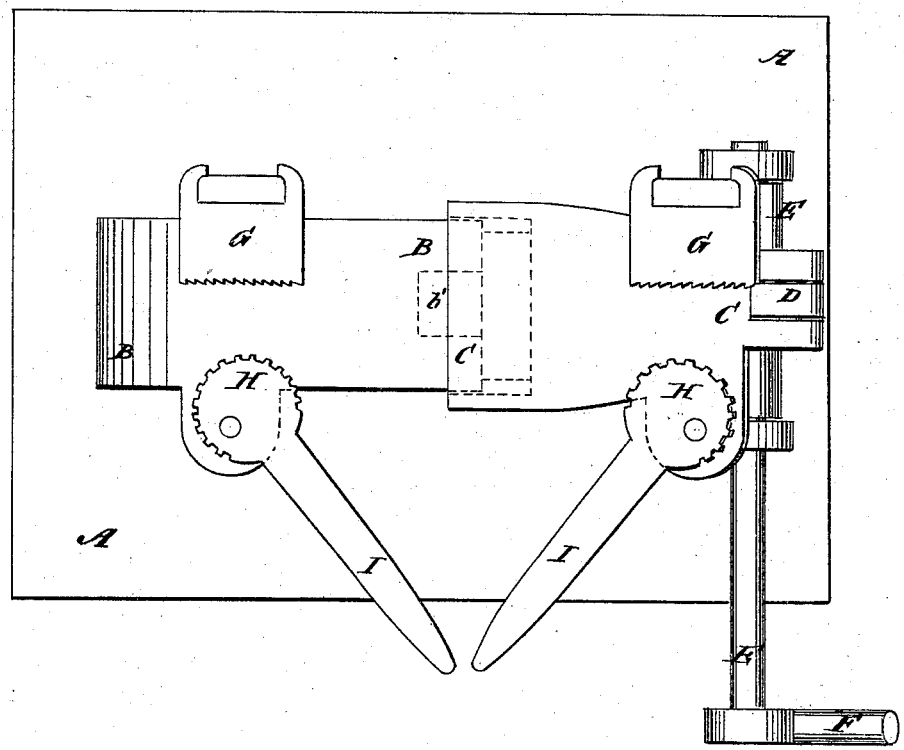

Be it known that I, EBENEZER B. ROSE, of Goshen, Orange county, State of New York, have invented a new and Improved Tire-Shrinker, of which the following is a specification:

In the accompanying drawing, Figure 1 is a side view of my improved tire-shrinker, part being broken away to show the construction. Fig. 2 is a top view of the same.

The object of this invention is to furnish an improved machine for shrinking tires and other irons easily and quickly, and which shall be simple in construction, convenient in use, and inexpensive in manufacture.

The invention consists in the combination of the stationary plate, the sliding plate, the toothed blocks, the toothed eccentrics, the crank-arm, the rock-shaft, and the lever with each other, and with the bed or frame, as hereinafter fully described.

A represents the bed or frame of the machine, to one end of which is attached the end of a plate, B. The plate B inclines upward, and projects inward, and its inner end rests upon, and is attached to, a stud, b', attached to the middle part of the bed A. C is a plate, the inner end of which is notched to receive, and rests and slides upon, the inner end of the plate B, and is kept from rising from said plate by flanges formed upon its side edges. The outer end of the sliding plate C is supported by, and pivoted to, a crank-arm, D, formed upon the shaft E, which works in bearings attached to the bed A. To the forward end of the shaft E is attached the lever F, by which the machine is operated. To the rear side of the outer ends of the stationary plate B and the sliding plate C, or to lugs formed upon said rear side, are attached blocks G, having ratchet-teeth formed upon the forward sides. To the forward side of the plates B C, or to lugs formed upon said forward sides, are pivoted the eccentrics H, which have teeth formed upon them, and are provided with lever-handles I.

With this construction the tire or other iron to be shrunk is heated, placed upon the plates B C, and clamped against the toothed blocks G by the eccentrics H I. Then, by operating the lever E, the plate C and its toothed block and eccentric are forced forward, shrinking the iron.

Having thus described my invention, what I claim as new, and desire to secure by Letters Patent, is—

In combination with the clamping-jaws of a tire-upsetting machine, the stationary plate B, and the sliding plate C, the latter lapping upon and across the former, and hinged at its opposite end, substantially as described.

EBENEZER B. ROSE.

Witnesses:
DANIEL T. BROWN,
LOUIS T. BROWN.